(No Model.) 2 Sheets—Sheet 1.
W. H. SINGER.
MANUFACTURE OF BAND SAW PLATES.
No. 550,297. Patented Nov. 26, 1895.
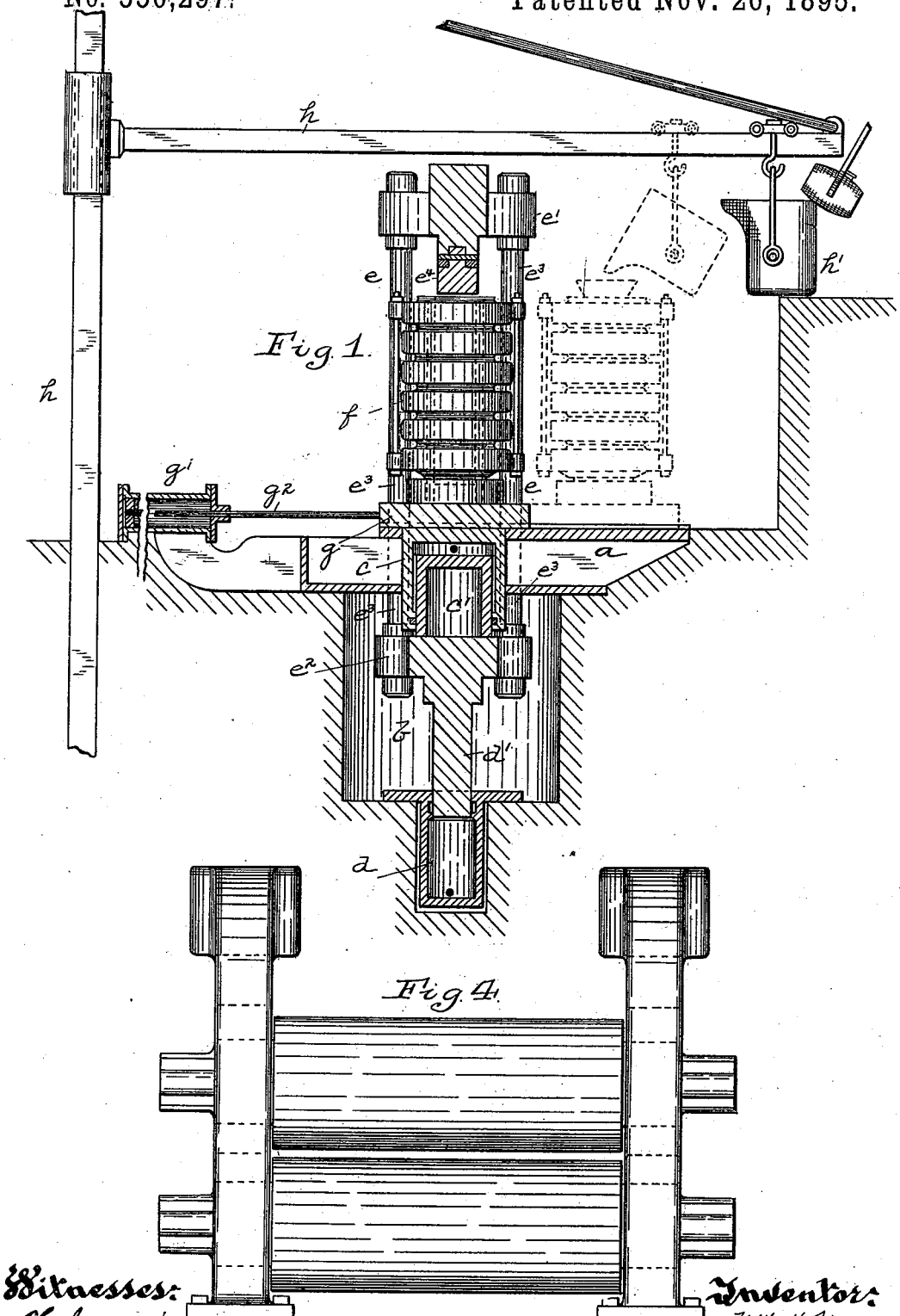

(No Model.) 2 Sheets—Sheet 2.
W. H. SINGER.
MANUFACTURE OF BAND SAW PLATES.
No. 550,297. Patented Nov. 26, 1895.
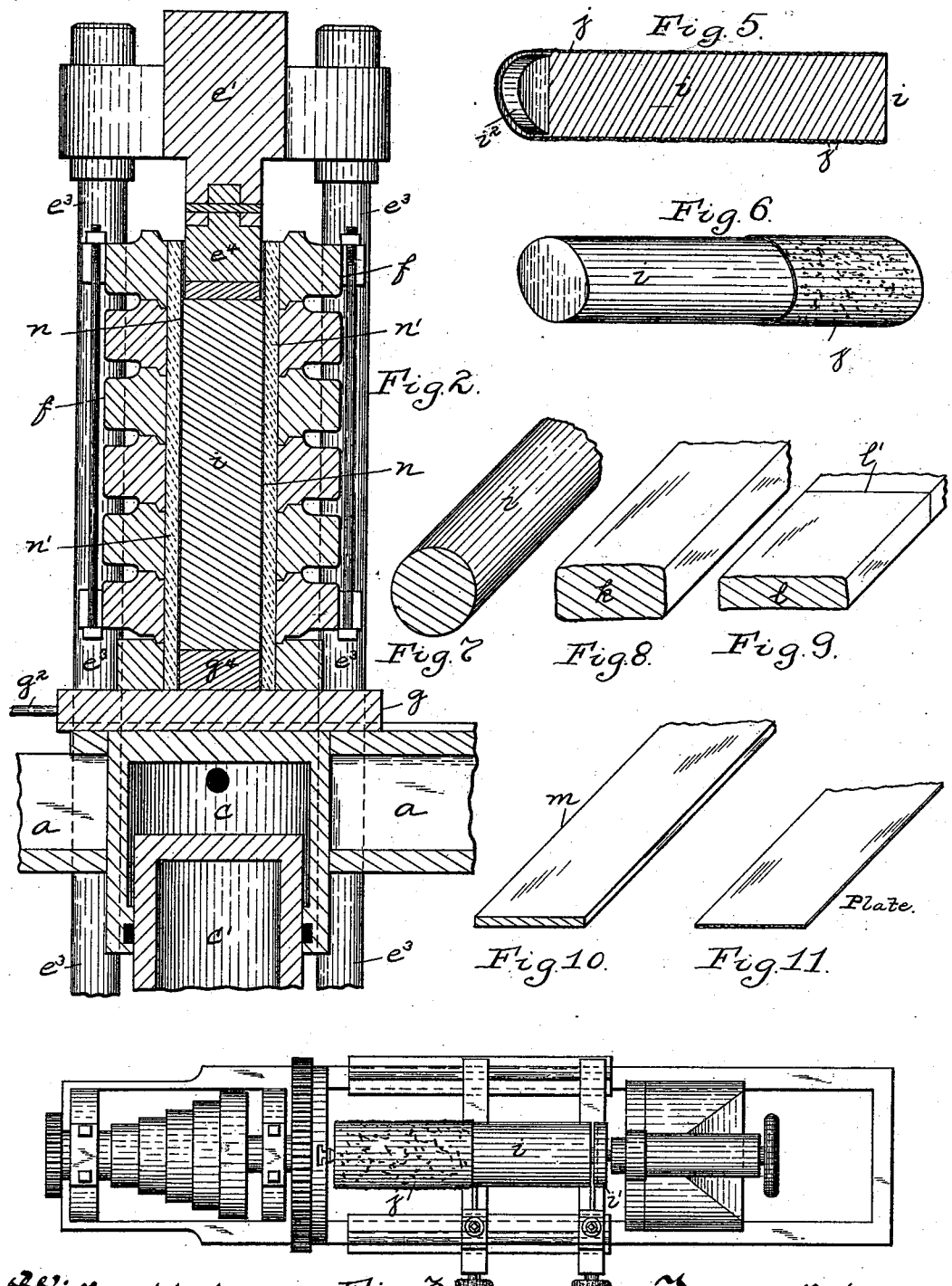

UNITED STATES PATENT OFFICE.

WILLIAM H. SINGER, OF ALLEGHENY, PENNSYLVANIA.

MANUFACTURE OF BAND-SAW PLATES.

SPECIFICATION forming part of Letters Patent No. 550,297, dated November 26, 1895.

Application filed January 19, 1894. Serial No. 497,428. (No model.)

*To all whom it may concern:*

Be it known that I, WILLIAM H. SINGER, a resident of Allegheny, in the county of Allegheny and State or Pennsylvania, have invented a new and useful Improvement in the Manufacture of Band-Saw Plates; and I do hereby declare the following to be a full, clear, and exact description thereof.

My invention relates to the manufacture of band-saws or the plates for forming band-saws. These saws, as employed for the sawing of logs into boards or other shapes, are formed of long thin plates, on an average of about fifty-five feet in length, four to twelve inches in width, and one-eigth inch or less in thickness, a series of teeth being formed along one side of the same, the band being placed around large driving wheels or pulleys and its ends being connected by suitable means, the band-saw being driven continuously and passing directly through the log or board. The band-saws are used to a large extent instead of the circular saws, for the reason that the kerf or cut made by the band-saw is narrower than that cut by the circular saw, and a large percentage of lumber is therefore saved. The ordinary method of forming these band-saws has been to break down an ordinary cast-steel ingot by hammering and rolling and finally to roll it to the long narrow plate of proper gage for the saw, after which it was carefully examined to see whether there were any seams or imperfections in the edge of the plate, as such seams would lead to the splitting or flaking of the plate either in the formation of the teeth, the tempering of the plate, or in the early use thereof, so that the saw was rendered useless. These imperfections are caused by the piping and honey-comb or pin-holes in the ingot as cast, but are generally so imperceptible that though they exist they cannot be discovered and the plates are shipped to the saw-maker, who finishes the plates, cuts the teeth therein, and polishes the plates without discovering any imperfections in the edge thereof, the imperfections being latent until the actual swaging and setting of the teeth, at which operations, as the points of the teeth are spread, the metal will split or flake off and render the whole saw imperfect, requiring the recutting thereof to a narrower width, in which case like imperfections might be found to exist, or the same imperfection to extend farther into the plate and require the entire abandonment of the plate and the loss of the saw-maker's time and labor, as well as the cost of the making of the plate. The imperfections are also sometimes discovered by the user of the saw in the same way, and a majority of the plates made in this way have been found to be imperfect, so that the cost of the finished saws has been necessarily increased by the risk run by the manufacturer in connection with these imperceptible imperfections in the saw-plates, and a method to overcome the same has been earnestly sought for.

In Letters Patent granted to me October 9, 1888, No. 390,809, I described a method of forming circular-saw plates by which like objections to that class of plates were overcome and which has resulted in the formation of perfect saw-plates, that method consisting in casting a large body of molten steel within the mold and subjecting it to heavy and continuous pressure during cooling, dividing the compressed ingot into sections or disks, and finally reducing said disks in thickness and enlarging them radially to form the circular plates, it being found that by such methods of manufacture perfect, solid, and homogeneous circular-saw plates could be obtained, and all imperfect metal, if any was present, was necessarily on the outside of the plates and was removed as the plates were trimmed to shape. Though the present method requires the same steps to some extent, that method was not applicable to the making of band-saw plates, for reasons hereinafter set forth, and the object of the present invention is to provide a method for forming such plates with perfect edges and perfect homogeneous bodies which contain no such imperfections as would lead to the condemnation and loss of the plates.

To these ends my invention comprises, generally stated, the method of forming band-saw plates, consisting in casting the steel within an ingot-mold having a sheet-metal lining, compressing the steel to form a solid and homogeneous ingot, removing the sheet-metal shell and other foreign matter from the compressed ingot, and heating and reducing the blank so produced to a band of desired width and thickness, it being found that in this way a perfect band-saw plate can be produced, in which all the objections above referred to are overcome.

To enable others skilled in the art to practice my invention, I will describe the same more fully, referring to the accompanying drawings, in which—

Figure 1 is a view, partly in section, illustrating the compressing apparatus employed for the formation of the compressed steel ingot. Fig. 2 is a longitudinal central section of part thereof, showing the ingot therein. Fig. 3 is a view of the lathe for turning the compressed ingot. Fig. 4 is a view of the rolls for reducing the blank. Fig. 5 is a sectional perspective of the compressed ingot before removal of the surface metal therefrom. Figs. 6 and 7 are perspective views of the blank, showing part or all of the surface metal removed therefrom. Figs. 8 and 9 show the steps of reducing the cylindrical blank to slab form ready for introduction into the rolls, and Figs. 10 and 11 show the steps of bringing the blank to the finished band form.

Like letters of reference indicate like parts in each of the views.

Though my invention may be employed with any suitable form of apparatus, I have illustrated the apparatus employed by me for the purpose, a large part of which is also illustrated in said Patent No. 390,809, and it will not be necessary to describe the same in detail.

The compressing apparatus employed consists of the bed $a$, firmly supported over a pit $b$, which contains the hydraulic compressing apparatus, that shown having two cylinders $c$ $d$, the cylinder $c$ being employed to obtain the heavy pressure necessary in compressing the ingot, while the cylinder $d$ is employed to raise and lower the pressing-frame during the other operations of the apparatus, the said cylinders having the pistons or plungers $c'$ $d'$, the compressing apparatus having the pressing-frame $e$, formed of the cross-heads $e'$ $e^2$, and the bars $e^3$, connecting the same, the pressing-plunger $e^4$ depending from the upper cross-head. The ingot-mold $f$ is shown as composed of a series of rings, and the mold is preferably formed cylindrical, the number of cylindrical rings being bolted together, as shown, so as to form the complete mold, the said mold being more particularly described in detail in Letters Patent No. 390,810, granted to me October 9, 1888. This ingot-mold is shown as resting upon a carriage $g$, operated by hydraulic apparatus $g'$, having a piston-rod $g^2$, by which the ingot-mold is carried under the pressing apparatus or is drawn to one side therefrom for the purpose of filling the mold; this being generally accomplished by means of a crane $h$, carrying a large ladle $h'$, and into which the molten steel is poured from the crucibles, as illustrated, the metal being then carried upon the crane to and introduced into the ingot-mold, which is carried by the hydraulic apparatus $g'$ under the press. The pressing apparatus has preferably a base-block $g^4$, which enters within and forms the base of the ingot-mold.

In preparing the mold for the reception of the metal provision must be made to permit of the escape of the gases contained within the steel and to prevent the chilling of the exterior of the ingot, which would occur in case of an ordinary metal mold, the chilled exterior of the body of metal preventing the free escape of the gases, and for these reasons it has been found necessary to employ sand or some such lining for the mold. If, however, the metal is permitted to flow directly into contact with such sand lining, there is liability of the sand being cut down by the steel and becoming agglomerated with the molten steel, so that during the subsequent compressing of the steel, though all the gases may be driven out, this sand remains scattered through the ingot, or at least at the edges thereof, and forms as serious imperfections in the finished band as would be caused by the presence of the gases or in the honey-comb formed by the gases. The sand is liable to become mixed with the molten steel, both by the cutting away of the sand by the molten metal when the latter is poured and by the fusing of the sand by the highly-heated metal and the forming of an agglomerated layer on the exterior of the ingot, which would lead to like imperfections. To prevent the formation of the ingot with such imperfections, I employ a sheet-metal lining $n$ within the ingot-mold, which lining can be made of iron, steel, or even of other suitable metal, and between which lining and the body of the mold the sand is packed solidly, as at $n'$, so as to sustain the pressure in the compressing of the steel, this sheet-metal lining preventing the cutting away of the mold lining on the entrance of the highly-heated steel, and also preventing the agglomeration of the sand with the body of the steel of the ingot, as where the heat is so high as to cause such agglomeration the sand unites with the exterior surface of the sheet-metal lining. This sheet-metal lining is shown and described in said Patents Nos. 390,809 and 390,810.

In the formation of the compressed ingot, as described in said patents, after the proper lining of the mold, as above described, the molten steel is filled into the same and is subjected to a high and continuous pressure, preferably reaching from twelve thousand to fourteen thousand pounds per square inch, under which pressure the gases are forced first through the sheet-metal lining, which, of course, is rendered soft by the contact of the highly-heated metal and is penetrated or punctured by the gases forced from the steel, and these pass through the sand and escape from the mold, the pressure being preferably continued until the ingot is thoroughly set and hardened, and the result being the formation of an ingot which is solid, homogeneous, and entirely free from blow-holes, and an ingot of the same quality throughout, except that it is surrounded by a sheet-metal shell formed by the lining $n$, which is either of different carbon or of an entirely-different metal. As, however, it is necessary to form from the compressed ingot a band in which the exterior metal of the ingot or blank forms the surface and edges of the finished article, and the ingot so produced is either inclosed within a metal shell of different metal from the body of the ingot or has its surface formed of an agglomeration of sand and steel, a plate having a perfect surface could not be formed therefrom. To form such plate, I take the ingot and by means of a suitable lathe, such as shown in Fig. 3, or by other suitable planing apparatus, I turn or remove from the surface thereof the surface metal, including the sheet-metal shell or the portion of the metal which contains imperfections which might affect the finished band to be formed therefrom. The skilled operator can quickly ascertain the necessary depth of metal to be turned or removed from the ingot to remove therefrom all imperfect metal and expose an absolutely-perfect surface to the compressed ingot. Where the sheet-metal shell is used, it is only necessary to plane off enough metal to remove the shell.

Description of the lathe shown in Fig. 3 is not considered necessary, it being an ordinary turning-lathe of great strength, in which the ingot $i$ is placed, and by means of the lathe-tools the surface metal, as at $j$, removed therefrom, and the head $i'$ of the ingot also turned therefrom, the plunger of the compressing apparatus having formed a seat $i^2$ in such head, which it is desirable to have removed. The compressed ingot as it comes from the mold is shown in Fig. 5, and the blank formed from the same by the planing or turning operation above described is shown in Figs. 6 and 7. A perfect compressed steel blank absolutely free from any imperfections and having an absolutely-perfect surface is thus produced. This blank is then heated and reduced in any suitable way to form the band-saw. It may be reduced entirely by rolling or by a hammering and rolling operation. For practical purposes I prefer to reduce it by hammering and rolling, and the cylindrical blank is therefore introduced into a suitable furnace and raised to a high heat and subjected to a swaging operation under the hammer, so as to break it down into slab form, it being generally found necessary to bring the blank to about the shape shown at $k$, Fig. 8, and to again reheat the blank and swage it down to slab form, as shown at $l$, Fig. 9. The blank is then in proper condition for rolling in the ordinary plate-metal rolls, a set of which is shown in Fig. 4, the rolls employed being of course of any suitable shape, whether two or three high, a set of two-high rolls being shown in the drawings, the rolls being driven by any suitable power. The slab formed by hammering is either cut by shears or cut under the hammer to blanks of suitable size to form the finished saw-plates—that is, of suitable weight to produce the desired length and width of plate, the slab $l$ being severed, as at $l'$, into different slabs ready to be fed to the rolls. These slabs of proper size are then reheated and rolled into band form, being generally reduced to thin slabs or thick plates, as shown at $m$, Fig. 10, and again reheated and by rapid-running plate-rolls rolled out to the finished plate for the band-saw, such plate being of exact gage and width desired, the width of the plate of course being obtained by edge-rolling, as found necessary.

It will be seen that in describing the method of forming the band-saw plates I have described the formation of a cylindrical ingot. I prefer to form such an ingot as one step in the method, because the ingot-mold of that form can better sustain the pressure, and, as a matter of great importance, because the compressed ingot can be turned to remove the sheet-metal shell or other foreign matter much more rapidly and at much lower cost than if the ingot is of angular form and requires longitudinal planing. The band-saw plates so produced are free from imperfections, the plates produced by this method being found so perfect that, though large numbers have been made and sold, absolutely no complaints have been received on account of imperfections therein, and as the metal is solid and homogeneous throughout it is found that there is no liability of the opening of the seams or splits by the subsequent cutting of the saw-teeth in the edge of the plate, or by the polishing or tempering of the plate, or the swaging, resetting, or other work upon the teeth thereof. Such plates are obtained, because in the casting thereof all of the gases leading to such imperfections are driven out under the immense pressure brought upon the metal, agglomeration of the sand directly with the molten steel is prevented through the sheet-metal lining of the mold, and though the cutting edges of the saw are necessarily formed from the exterior of the metal of the compressed ingot all foreign matters, such as the inclosing shell or any sand agglomerated thereto, are removed from the compressed ingot, leaving an absolutely-perfect surface and a body of steel of the desired carbon and absolutely perfect throughout, which by the subsequent rolling operation is brought to band form.

What I claim as my invention, and desire to secure by Letters Patent, is—

The improvement in the art of making band saw plates, consisting in casting steel within an ingot mold having a sheet metal lining, compressing the steel to form a solid and homogeneous ingot, removing the sheet metal shell and other foreign matter from the compressed ingot, and heating and reducing the blank so produced to a band of desired width and thickness, substantially as set forth.

In testimony whereof I, the said WILLIAM H. SINGER, have hereunto set my hand.

WILLIAM H. SINGER.

Witnesses:
   DAVID S. MCCANN,
   ROBT. D. TOTTEN.